United States Patent [19]

Stude

[11] Patent Number: 5,400,957
[45] Date of Patent: Mar. 28, 1995

[54] REUSABLE ENVELOPE

[76] Inventor: Michael Stude, 1021 S. Grove Ave., Barrington, Ill. 60010

[21] Appl. No.: 24,733

[22] Filed: Mar. 1, 1993

Related U.S. Application Data

[63] Continuation-in-part of Ser. No. 872,545, Apr. 23, 1992, Pat. No. 5,197,663.

[51] Int. Cl.$^6$ ............ B65D 27/04; B65D 27/06
[52] U.S. Cl. ............ 229/303; 229/302; 229/304; 229/305; 229/306; 229/316
[58] Field of Search ......... 229/300, 301, 302, 303, 229/304, 305, 306, 313, 314, 316

[56] References Cited

U.S. PATENT DOCUMENTS

| 192,522 | 6/1877 | Marshall | 229/301 |
|---|---|---|---|
| 1,064,302 | 6/1913 | Donohue . | |
| 1,575,769 | 3/1926 | Kaye . | |
| 1,953,192 | 4/1934 | Rossiter | 229/303 X |
| 3,111,257 | 11/1963 | Peach | 229/302 |
| 3,411,699 | 11/1968 | Pine et al. | 229/303 X |
| 3,982,689 | 9/1976 | Retrum | 229/313 X |
| 4,308,987 | 1/1982 | Solomon . | |
| 4,334,618 | 6/1982 | Buescher . | |
| 4,403,696 | 9/1983 | Newell . | |
| 4,436,202 | 3/1984 | Berkley . | |
| 4,715,531 | 12/1987 | Stewart et al. . | |
| 4,729,507 | 3/1988 | Kim . | |
| 4,730,768 | 3/1988 | Gendron | 229/303 X |
| 4,775,095 | 10/1988 | Emmott | 229/303 |
| 4,993,624 | 2/1991 | Schlich . | |
| 5,169,061 | 12/1992 | Buescher | 229/305 |
| 5,213,258 | 5/1993 | Kim | 229/301 X |
| 5,224,647 | 7/1993 | Yanow | 229/303 X |
| 5,232,150 | 8/1993 | Solomons | 229/303 X |
| 5,248,082 | 9/1993 | Elmlinger | 229/305 X |

FOREIGN PATENT DOCUMENTS

| 0343731 | 4/1937 | Italy | 229/313 |
|---|---|---|---|
| 85876 | 11/1920 | Switzerland | 229/301 |
| 0009043 | of 1913 | United Kingdom | 229/301 |
| 0128074 | 6/1919 | United Kingdom | 229/302 |

Primary Examiner—Allan N. Shoap
Assistant Examiner—Jes F. Pascua
Attorney, Agent, or Firm—Thomas R. Vigil

[57] ABSTRACT

The reusable mailing envelope is constructed from a blank comprising a front panel having an inner surface and an outer surface and a rear panel having an inner surface and an outer surface and being connected to the front panel along a first fold line. A seal flap formation is coupled to one of the panels along a second line spaced from the first fold line and includes a seal flap having adhesive on an inner surface thereof for adhering the seal flap to one of the panels in a first mailing condition. The seal flap formation further includes a first seal flap section having an inner surface and an outer surface and being connected along a third line to the seal flap and a second seal flap section having an inner surface and an outer surface and being connected along a fourth fold line to the first seal flap section and being coupled along the second line to one of the panels. Structure is provided for securing the front and rear panels together along adjacent side edges thereof. Also, reusable structure is provided for allowing the envelope to be reused as a mailing envelope and is coupled to one of the panels, the reusable structure including at least a part of at least one of the first or second seal flap sections. The reusable structure has the first mailing condition when initially mailed and a second condition wherein at least a portion of one of the seal flap sections of the reusable structure forms a resealing flap which is sealed to at least one surface of the envelope for remailing the reusable envelope. At least one of the first and second seal flap sections having adhesive on and extending at least partially across said inner surface thereof parallel to said third and fourth lines and at least a part of at least one of the seal flap sections being detachable from the envelope.

32 Claims, 8 Drawing Sheets

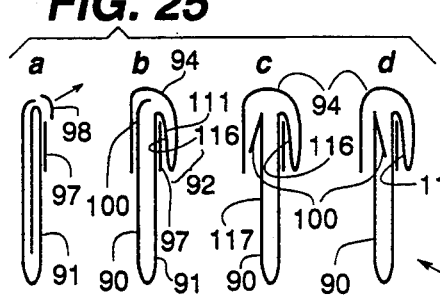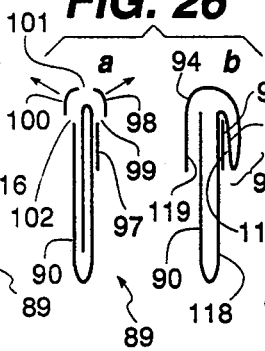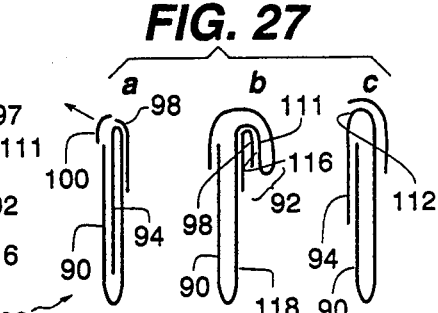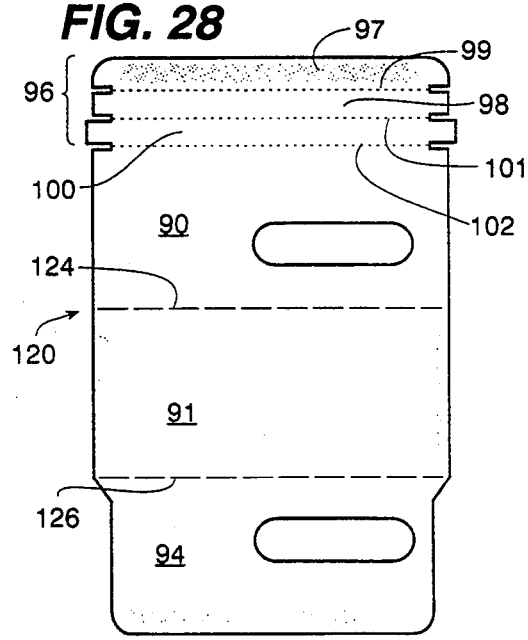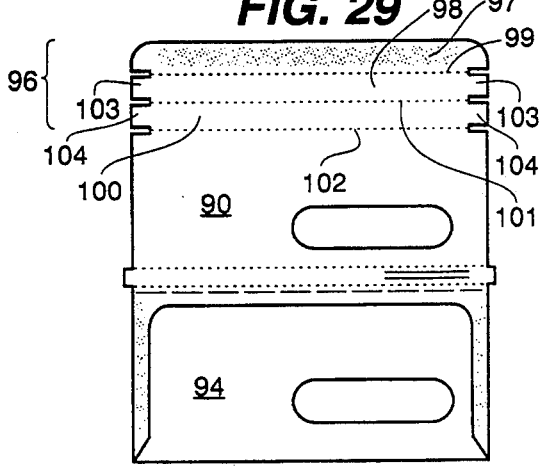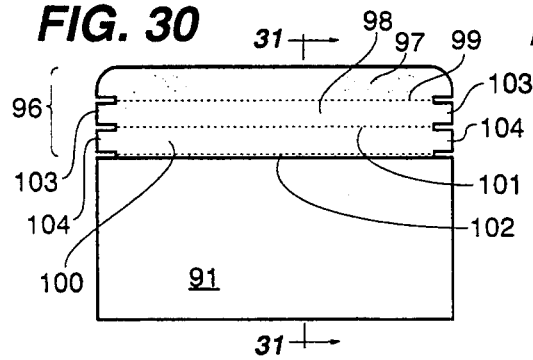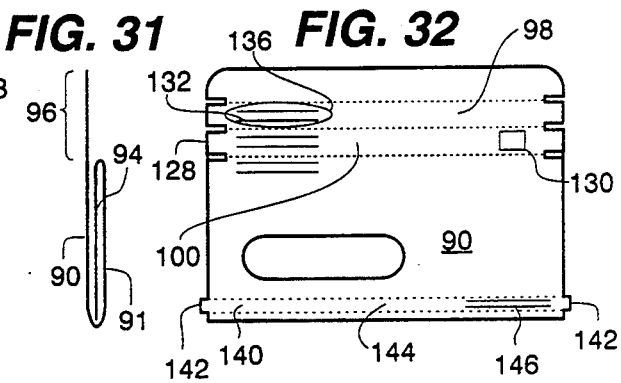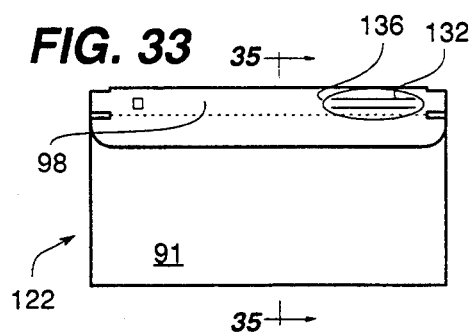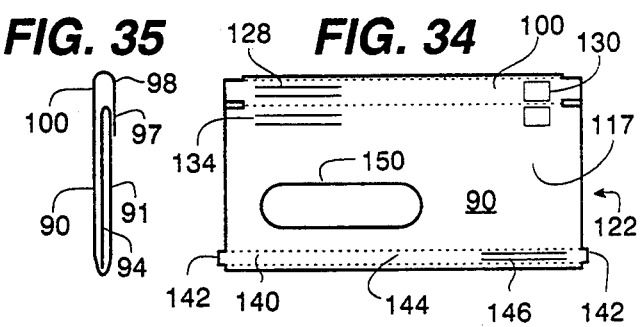

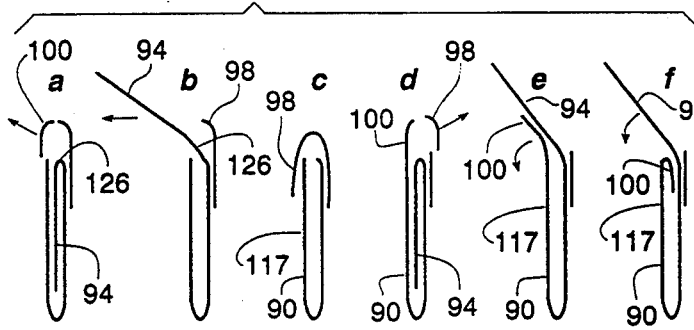
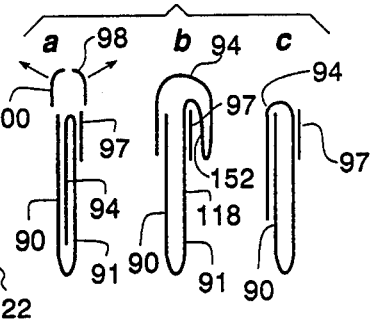
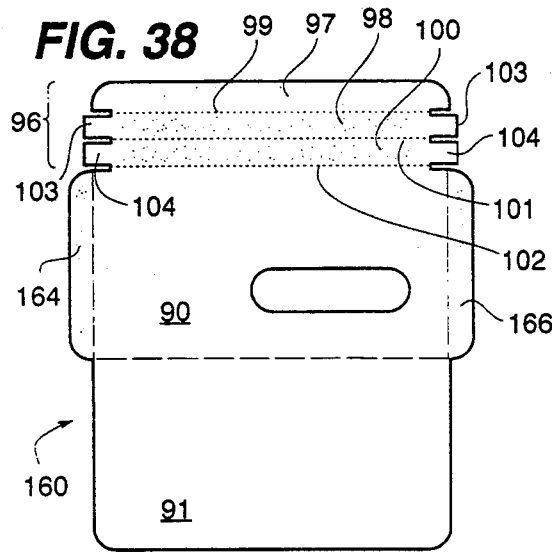
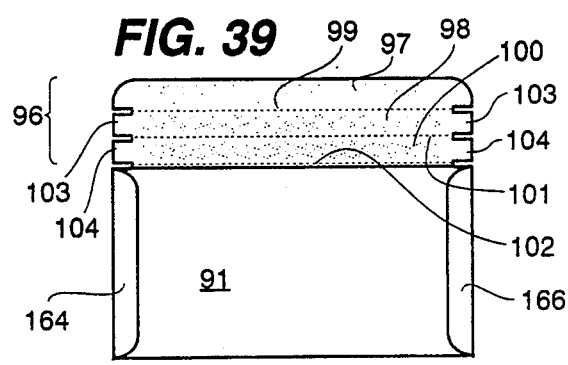
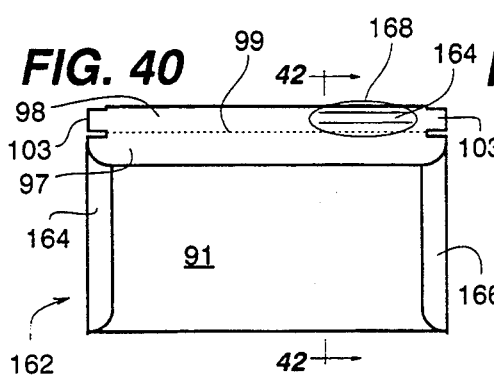
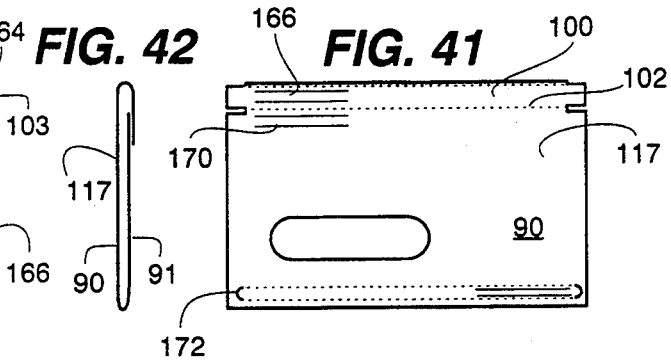
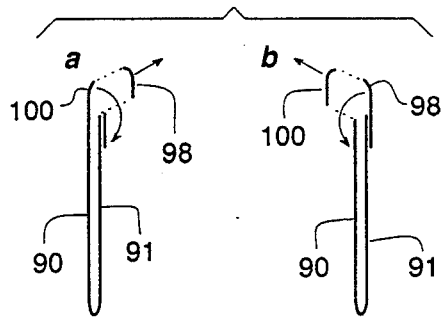
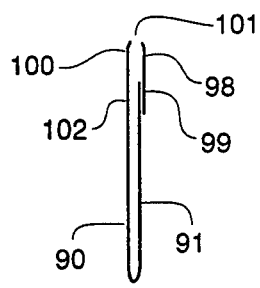

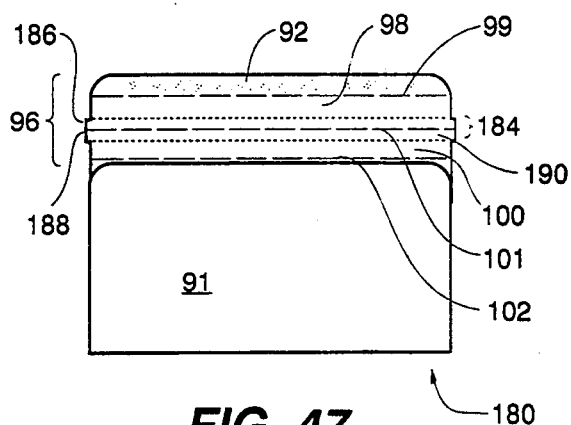
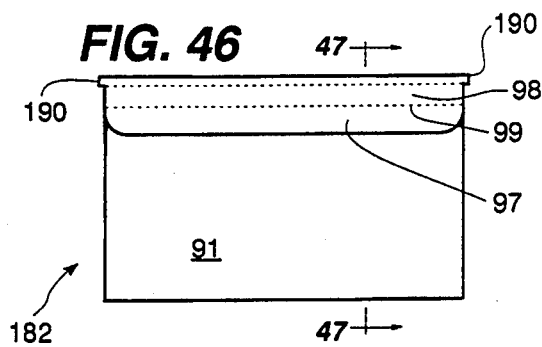
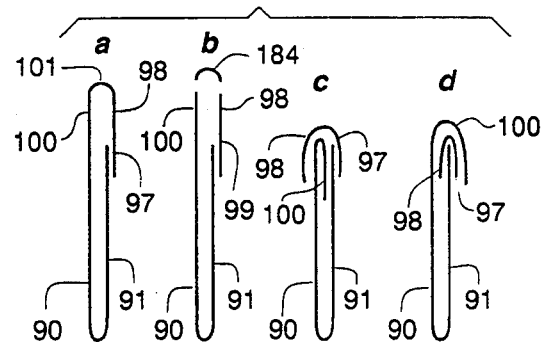
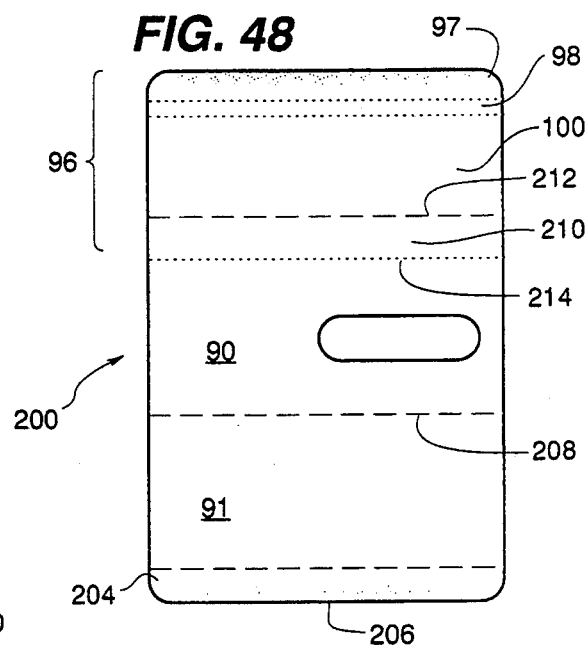
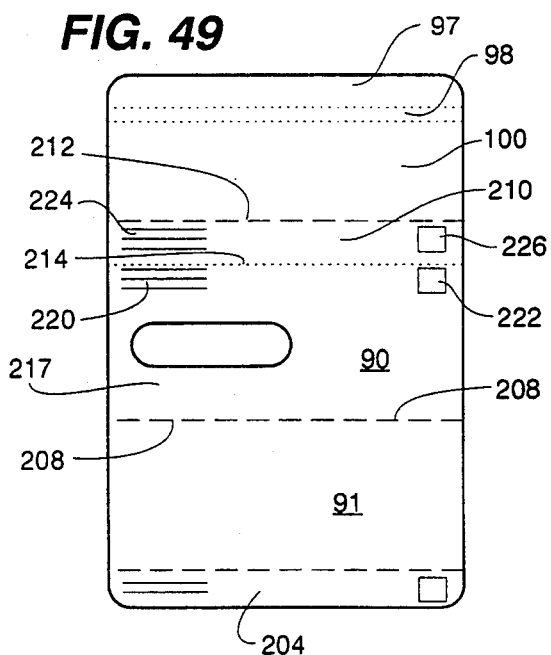
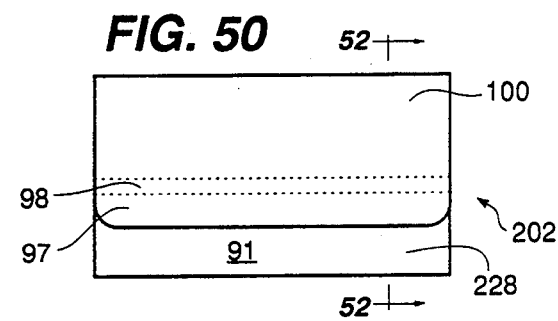
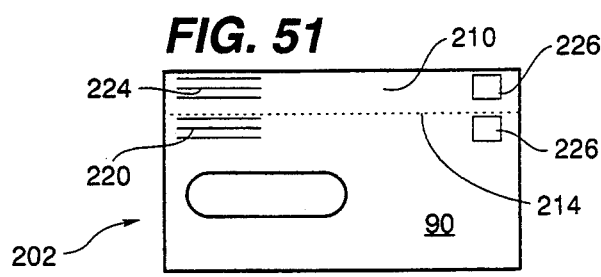

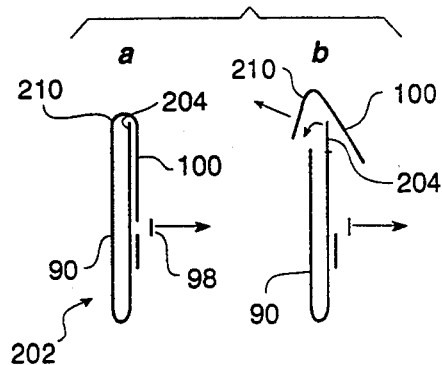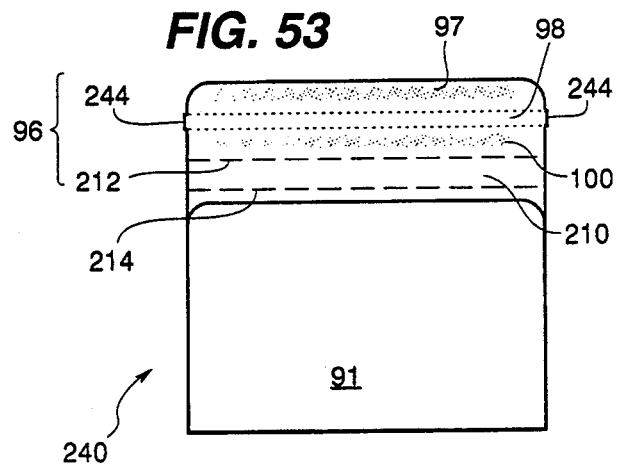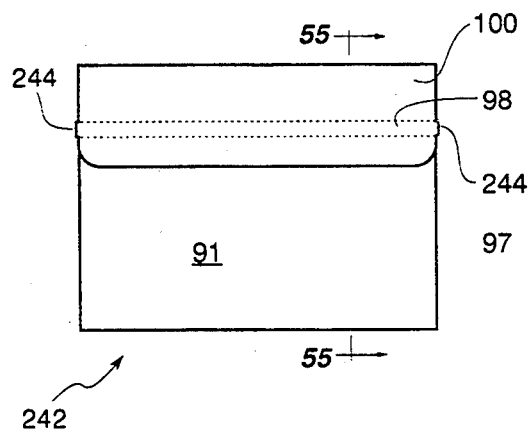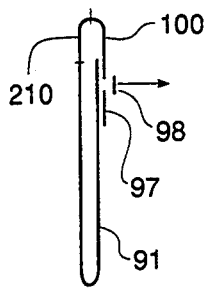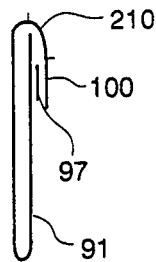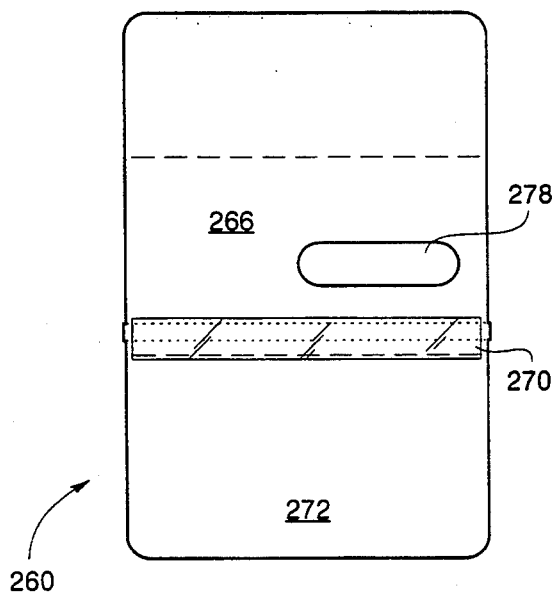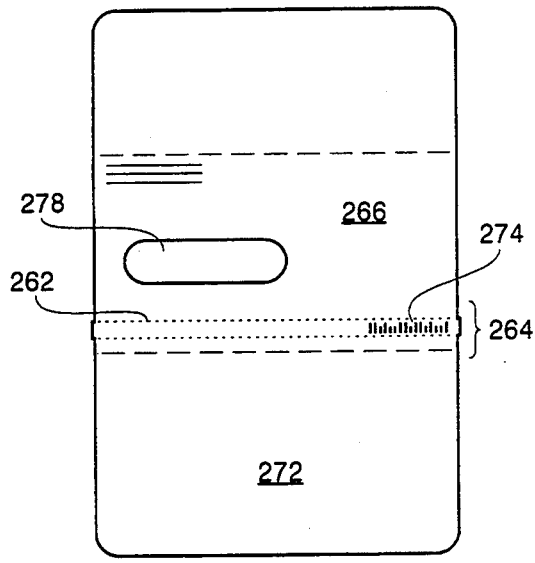

REUSABLE ENVELOPE

CROSS-REFERENCE TO RELATED APPLICATIONS

This application is a continuation-in-part of U.S. application Ser. No. 07/872,545, filed on Apr. 23, 1992, and now issued to U.S. Pat. No. 5,197,663, on Mar. 30, 1993.

BACKGROUND OF THE INVENTION

1. Field of the Invention,

The present invention relates to improvements in envelopes adapted for reuse and, more particularly, to a reusable mailing envelope which is adapted for use for original mail and then for reuse for return mail.

2. Description of the Related Art Including Information Disclosed Under 37 CFR §§1.97-1.99.

Heretofore, a number of reusable mailing envelope structures have been proposed. Examples of some of these envelope structures are disclosed in the following U.S. patents:

| U.S. Pat. No. | Patentee |
| --- | --- |
| 4,993,624 | Schlich |
| 4,730,768 | Gendron |
| 4,729,507 | Kim |
| 4,715,531 | Stewart |
| 4,436,202 | Berkley |
| 4,403,696 | Newell |
| 4,334,618 | Buescher |
| 4,308,987 | Solomon |
| 1,064,302 | Donahue |
| 1,575,769 | Kaye |

The Schlich U.S. Pat. No. 4,993,624 discloses a reusable envelope for commercial mass mailings. The envelope includes a front panel, a rear panel, a two-portion closure flap and a window. The window has a bottom edge partly coextensive with a bottom edge of the front panel of the envelope. The two-portion closure flap contains a first trip sealing panel and a second trip sealing panel. A bottom edge of the second trip sealing panel connects to a top edge of the rear panel of the envelope along a fold line. A bottom edge of the first trip sealing panel connects to a top edge of the second trip sealing panel along a perforation line. For initial mailing the first trip sealing panel folds downwardly, about the fold line connecting the first trip sealing panel to the second trip sealing panel. The first trip sealing panel then seals to the front panel of the envelope. To open the envelope the addressee removes the first trip sealing panel along the perforation line connecting the first and second trip sealing panels. To reseal the envelope, the second trip sealing panel folds about the fold line connecting the second trip sealing panel to the rear panel, over the front panel of the envelope and then seals to the front panel of the envelope.

The Gendron U.S. Pat. No. 4,730,768 discloses a reusable envelope having a front panel and a rear panel. A first extension is attached to a top edge of the front panel along a first perforation line so that the first extension may be detached from the envelope on reuse. A first closure flap is attached to a top edge of the first extension along a second perforation line. Upon initial sealing of the envelope, the first closure flap folds downwardly along the second perforation line and seals to a rear panel of the envelope. A second closure flap is attached to a top edge of the rear panel of the envelope. The second closure flap is positioned in the interior of the envelope upon initial mailing. For remailing, the second closure flap is removed from the interior of the envelope and folded downwardly over the front panel and sealed.

The Kim U.S. Pat. No. 4,729,507 discloses an adhesive sealed envelope having a tear away portion extending across an area in a back panel lying under an adhesive seal of a top flap when the envelope is sealed. A tear line defining the tear away portion is hidden by the top flap. The envelope is opened in the natural way by grasping the flap and pulling upwardly to cause the envelope to open along the tear line.

The Stewart U.S. Pat. No. 4,715,531 discloses a remailable envelope constructed from a single sheet. The sheet contains perforation lines running parallel to but located inwardly from the peripheral edges of the sheet. Initially the envelope is sealed by folding the sheet in half and sealing areas between the perforation lines and the peripheral edges. The areas between the perforation lines and the peripheral edges are detached for reuse of the envelope.

The Berkley U.S. Pat. No. 4,436,202 discloses a reusable envelope for X-ray prints adapted to receive a removable card insert.

The Newell U.S. Pat. No. 4,403,696 discloses a reusable envelope assembly which includes a first tear line across a front panel and a second tear line across a back panel. The first tear line is spaced inwardly from one side of the envelope a distance greater than the corresponding separation between the second tear line and the one side of the envelope. An insert formed within the envelope is secured between the front panel and the back panel along one side. By pinching the envelope, and exerting a pulling force on the envelope from its opposite sides, the envelope is burst, separating the insert and a removable portion of the envelope along the first and second tear lines. The separation between the first and second tear lines exposes a portion of the back panel that extends outwardly from the first tear line. The extended portion of the back panel is foldable over the first tear line and the front panel as a covering flap, enabling the envelope to be used a second time. The remainder of the envelope includes a third and a fourth tear line of greater bursting strength than the first and second tear lines. The third and the fourth tear lines are used to separate the reused envelope in half for opening purposes.

The Buescher U.S. Pat. No. 4,334,618 discloses a snap-open envelope having perforation lines arranged so that an end portion separates from a remaining portion of the envelope to expose the contents. The remaining portion of the envelope provides a return or reusable envelope having an end closure flap which, when the return envelope is closed, may cover a portion of the front panel of the original envelope, with a portion of the original back panel of the original envelope becoming the front panel of the return envelope.

The Solomon U.S. Pat. No. 4,308,987 discloses a remailable envelope comprising a back panel, a front panel, a tear strip connected to a top edge of the front panel along a first tear line, a top flap connected to a top edge of the tear strip along a second tear line, and a resealing flap connected to the back panel along a first fold line. In its initial state, the reseal flap is located in the interior of the envelope, the top edge and the tear strip are folded over the back panel and the top edge is adhesively sealed to the back panel. The envelope is opened by removing the tear strip along the first and second tear lines. The envelope is reused by folding the reseal flap a second fold line over the front panel of the envelope and sealing the reseal flap to the front panel with an adhesive.

The Kaye U.S. Pat. No. 1,575,769 discloses a reusable envelope having a first extension attached to a front panel and a second extension attached to a rear panel. The extensions attach to the front and rear panels along fold lines which form the top edge of the sealed envelope. Tear lines which extend parallel to the fold lines are located inward from the fold lines and are slightly spaced therefrom. Adhesive is applied to the space between the tear lines so that when the top flap is folded in sealing the envelope, the portions of the paper between the fold lines and tear lines will be fastened by the adhesive.

The Donohue U.S. Pat. No. 1,064,302 discloses a return reply envelope containing a body portion and a back flap portion of less height than the body, connected to the bottom edge of the body portion along a first fold line. The envelope also comprises a seal flap connected to the top edge of the body portion along a second fold line and a return address flap connected to the top edge of the back flap portion along a third fold line. The envelope is initially sealed by folding the seal flap downwardly over the back flap and adhesively sealing the seal flap to the back flap. The return address flap is located in the interior of the envelope. Upon opening the envelope the seal flap is disconnected from the body portion by either ripping along the second fold line or by removing portions of both the seal flap and body portion in a small area about the second fold line. The return address flap is removed from the interior of the envelope and folded downwardly over an external surface of the body portion of the envelope and adhesively sealed thereto.

SUMMARY OF THE INVENTION

According to the present invention there is provided a reusable mailing envelope which is constructed from a blank comprising a front panel having an inner surface and an outer surface and a rear panel having an inner surface and an outer surface and being connected to the front panel along a first fold line. A seal flap formation is connected to one of the panels along a second line spaced from the first fold line and includes a seal flap having adhesive on an inner surface thereof for adhering the seal flap to one of the panels in a first mailing condition. The seal flap formation further includes a first seal flap section having an inner surface and an outer surface and being connected along a third line to the seal flap and a second seal flap section having an inner surface and an outer surface and being connected along a fourth fold line to the first seal flap section and being coupled along the second line to one of the panels. Structure is provided or securing the front and rear panels together along adjacent side edges thereof. Also, reusable structure is provided for allowing the envelope to be reused as a mailing envelope and is coupled to one of the panels, the reusable structure including at least a part of at least one of the first or second seal flap sections. The reusable structure has the first mailing condition when initially mailed and a second condition wherein at least a portion of one of the seal flap sections of the reusable structure forms a resealing flap which is sealed to at least one surface of the envelope for remailing the reusable envelope. At least one of the first and second seal flap sections having adhesive on and extending at least partially across said inner surface thereof parallel to said third and fourth lines and at least a part of at least one of the seal flap sections being detachable from the envelope.

BRIEF DESCRIPTION OF THE DRAWINGS

FIG. 25 is a group of cross-sectional views of the envelope shown in FIG. 24.

FIG. 26 is a group of cross-sectional views of the envelope shown in FIG. 25.

FIG. 27 is a group of cross-sectional views of the envelope shown in FIG. 25.

FIG. 28 is a plan view of a blank, similar to the blank shown in FIG. 17 for use in the construction of another reusable mailing envelope which is constructed according to the teachings of the present invention and which includes a reusable closing flap but without the folded panel portion shown in FIG. 17.

FIG. 29 is a plan view of the blank shown in FIG. 28 but shows a reusable closure flap folded over onto a rear panel of the blank and shows a removable strip having bar code thereon located on the front panel.

FIG. 30 is a rear view of the blank shown in FIG. 28 but shows the rear panel folded upwardly over a front panel of the blank.

FIG. 31 is a cross-sectional view of the blank shown in FIG. 30 and is taken along line 31—31 in FIG. 30.

FIG. 32 is a front view of the reusable mailing envelope blank shown in FIG. 30.

FIG. 33 is a rear view of the reusable mailing envelope with a seal flap thereof folded over and sealed to a rear panel to form an assembled envelope for mailing and shows stamp placement indicia and return address indicia printed on a section of the seal flap.

FIG. 34 is a front view of the reusable mailing envelope shown in FIG. 33 and shows stamp placement indicia and return address indicia on the front panel of the reusable envelope.

FIG. 35 is a cross-sectional view of the envelope shown in FIG. 33 and is taken along the line 35—35 in FIG. 33.

FIG. 36 is a group of cross-sectional views of the envelope shown in FIG. 35.

FIG. 37 is a group of cross-sectional views of the envelope shown in FIG. 35.

FIG. 38 is a front plan view of a blank for use in the construction of another reusable mailing envelope constructed according to the teachings of the present invention which includes a reusable seal flap, having three panel sections, with at least two of the sections having adhesive, glue or gum on an inner surface thereof.

FIG. 39 is rear plan view of the blank shown in FIG. 38, and shows the rear panel folded upwardly over a front panel and side flaps folded over the rear panel and sealed.

FIG. 40 is a rear view of the blank shown in FIG. 39, having the seal flap folded over the rear panel and sealed to form an assembled envelope for mailing and showing either return address indicia on, or a window in, a first section of the seal flap.

FIG. 41 is a front view of the envelope shown in FIG. 40 and shows return address indicia on the outer surface of the front panel of the envelope and on a second section of the seal flap and a removable strip having bar code thereon in the front panel at the bottom thereof.

FIG. 42 is a cross-sectional view of the envelope shown in FIG. 40 and is taken along line 42—42 in FIG. 40.

FIG. 43 is a group of cross-sectional views of the envelope shown in FIG. 42.

FIG. 44 is a cross-sectional view of the envelope shown in FIG. 32 and shows the seal flap opened along the top edge of the envelope such that the envelope can be reused in the manner shown in FIG. 47c or 47d.

FIG. 45 is a plan view of a blank for use in the construction of a reusable mailing envelope constructed according to the teachings of the present invention, similar to the blank shown in FIG. 38, but which has a tear off portion in the seal flap.

FIG. 46 is a rear view of the blank shown in FIG. 45 but shows the seal flap folded over and sealed to the rear panel to form an assembled envelope.

FIG. 47 is a group of cross-sectional views of the envelope shown in FIG. 46.

FIG. 48 is a rear plan view of another blank constructed according to the teachings of the present invention.

FIG. 49 is a front view of the blank shown in FIG. 48.

FIG. 50 is a rear view of an envelope formed by folding the rear panel of the blank shown in FIG. 48 up and the seal flap down.

FIG. 51 is a front view of the envelope shown in FIG. 50.

FIG. 52 is a group of cross-sectional views of the envelope shown in FIG. 50.

FIG. 53 is a rear plan view of another blank constructed according to the teachings of the present invention and shows a rear panel folded up against a front panel and a seal flap which is shorter in width then the seal flap shown in FIG. 48.

FIG. 54 is a rear plan view of an envelope formed by folding the seal flap shown in FIG. 53 downwardly over the rear panel.

FIG. 55 is a cross-sectional view of the envelope shown in FIG. 54, is taken along line 55—55 in FIG. 54 and shows a middle portion of the seal flap pulled away.

FIG. 56 is a cross-sectional view of the envelope shown in FIG. 55 after an upper portion of the seal flap forming a reusable closure flap is pulled down over the rear panel for resealing the envelope for return mailing of the envelope.

FIG. 57 is a rear plan view of a blank for an envelope and shows a piece of solid or transparent backing material, such as rectangular piece of cellophane, adhered to a lower margin of the rear side of a front panel behind a tear off strip in the front panel.

FIG. 58 is a front plan view of the blank shown in FIG. 57 and shows the tear off strip with bar code thereon.

DESCRIPTION OF THE PREFERRED EMBODIMENTS

Figure 1:
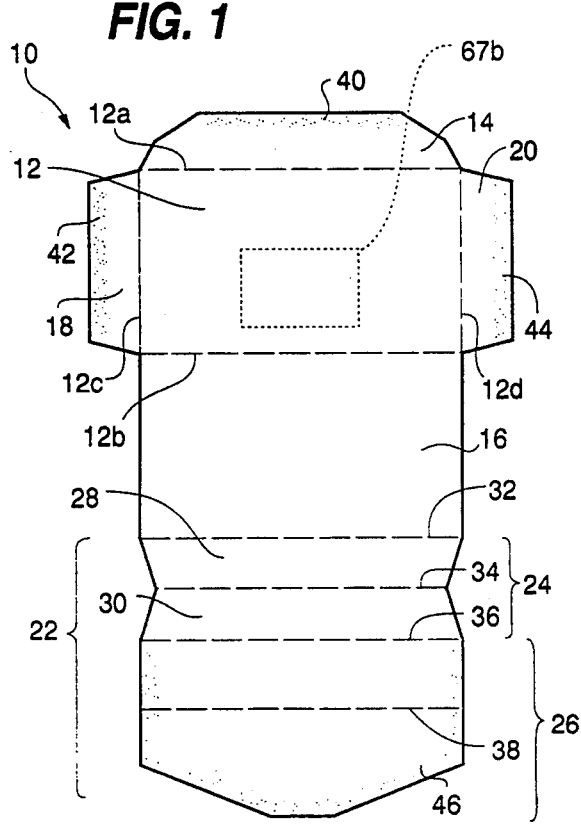
FIG. 1 is a plan view of a blank for use in the construction of a reusable mailing envelope which is constructed according to the teachings of the present invention and which is adapted for use for original mail and then reused for return mail.

While the reusable mailing envelope of the present invention is susceptible of several constructions, there is shown in FIGS. 1–58 several preferred embodiments of a reusable mailing envelope constructed according to the teachings of the present invention, with the understanding that the present disclosure is not intended to be limited to the specific constructions thereof illustrated in the drawings.

Figure 5:
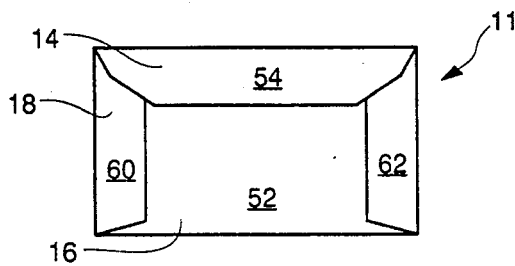
FIG. 5 is a rear view of the reusable mailing envelope with a seal flap and a side flap folded over and sealed to form an assembled envelope for mailing.
Figure 6:
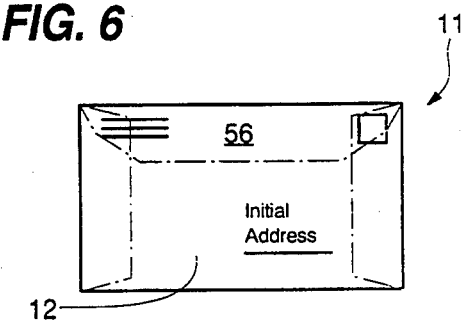
FIG. 6 is a front view of the reusable mailing envelope shown in FIG. 5.

Illustrated in FIG. 1, is a blank 10 for making a reusable mailing envelope 11 (FIGS. 5 and 6). The reusable mailing envelope 11 is formed from the blank 10 which includes: a front panel 12, a seal flap 14 connected at a fold line to the front panel 12, a rear panel 16 connected at a fold line to the front panel 12 opposite the seal flap 14, first and second side panels 18 and 20 each connected to the front panel 12 at fold lines, and reusable structure 22, for allowing the envelope 11 to be reused as a mailing envelope, connected to the front panel 12 along another fold line. The reusable structure 22 includes a foldable panel portion 24 and a reusable closure flap 26.

Figure 4:
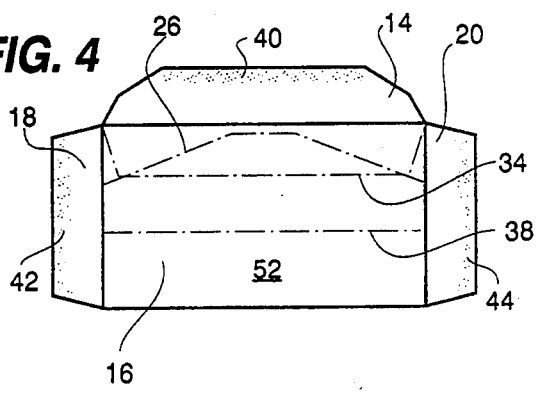
FIG. 4 is a plan view of the blank shown in FIG. 3 but shows the rear panel folded upwardly over a front panel of the blank.
Figure 7:
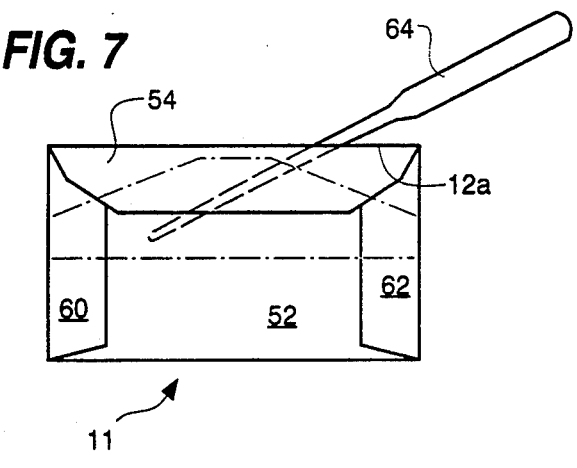
FIG. 7 is a rear view of the envelope shown in FIG. 5, being opened with a conventional letter opener.
Figure 8:
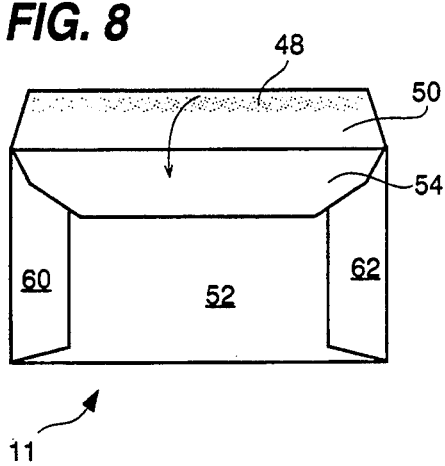
FIG. 8 is a rear view of the envelope shown in FIG. 5, with a foldable panel portion structure being removed from the inside of the envelope for eventual adhesion to an exterior surface of the envelope and illustrates a first step in a sequence of steps to construct the envelope for return mail.

The reusable structure 22 has a first condition inside the envelope when initially mailed, as illustrated in FIGS. 4 and 7, and a second condition wherein a portion is outside the envelope 11 when subsequently mailed, as illustrated in FIG. 8.

Fold lines 12a, 12b, 12c and 12d separate the front panel 12 from the flaps 14, 18 and 20 and the rear panel 16. More particularly, the seal flap fold line 12a separates the front panel 12 from the seal flap 14. Similarly, the rear panel fold line 12b separates the front panel 12 from the rear panel 16, the first side fold line 12c separates the front panel 12 from the first side panel 18, and the second side fold line separates the front panel 12 from the second side panel 20.

The foldable panel portion 24 includes a first center fold line 34 extending laterally thereacross dividing the panel 24 into a first panel section 28 and a second panel section 30. The first panel section 28 is adjacent and hingably connected to the rear panel 16 along a second fold line 32. The second panel section 30 is adjacent to and hingably connected to the reusable closure flap 26 along a third fold line 36.

The reusable closure flap 26 includes a center fold line 38 for facilitating the removal of the reusable closure flap 26 out of the envelope 11 to move the envelope 11 from the first condition to the second condition.

Adhesive strips, glue, or gum 40, 42 and 44 are included on the seal flap 14, the first side flap 18 and the second side flap 20 for sealing the flaps 14, 18 and 20 to the rear panel 16 to form the envelope 11.

Adhesive strips, glue, or gum 46 and 48 are provided on the reusable closure flap 46 and on the back side of the panel section 28 for remailing.

For initial mailing, the adhesive strips 40, 42 and 44 are adhered to an exterior surface 52 (FIG. 4) of rear panel 16, as illustrated in FIG. 5.

Figure 11:
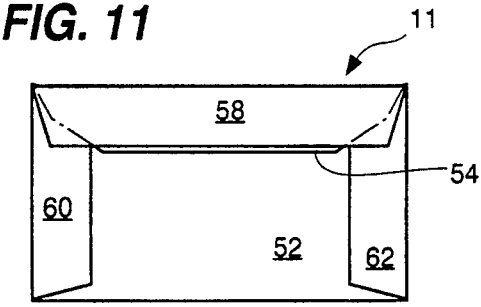
FIG. 11 is a rear view of the envelope shown in FIG. 10, stuffed, sealed and ready for remailing.
Figure 12:
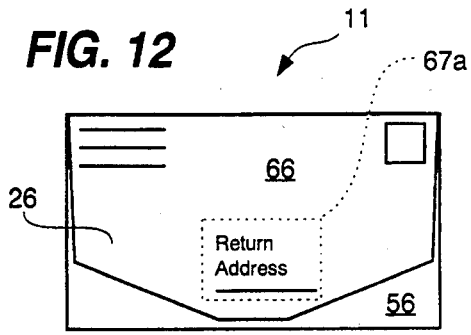
FIG. 12 is a front view of the envelope shown in FIG. 10, stuffed, sealed and ready for remailing.

In the reuse condition, 1) the adhesive strip 48 is adhered to an exterior surface 52 of the rear panel 16 and/or on an exterior surface 54 of the seal flap 14; and 2) the adhesive strip 46 on the reusable closure flap 26 is adhered to an exterior side surface 56 of the front panel 12, as illustrated in FIGS. 11 and 12, respectively.

FIGS. 2–6 illustrate how the envelope 11 is constructed and assembled from the blank 10 along the various fold lines for initial use.

Figure 2:
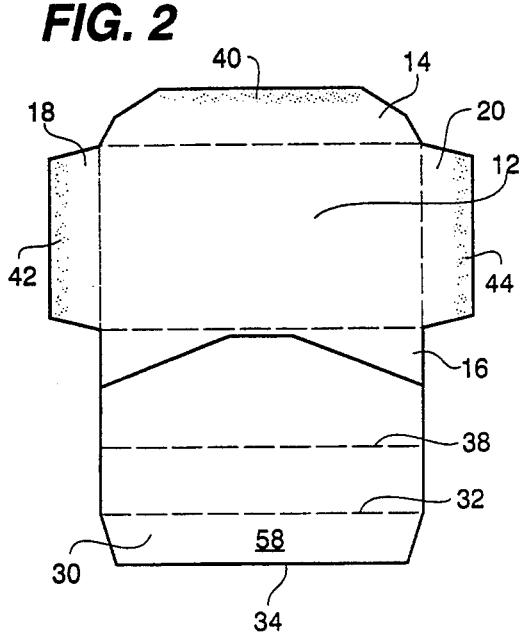
FIGS. 2 is a plan view of the blank shown in FIG. 1 but shows a reusable closure flap folded over onto a rear panel of the blank.

In FIG. 2, the second panel section 30 of the foldable panel portion 24 and the reusable closure flap 26 are folded over the rear panel 16 along the center fold line 34.

Figure 3:
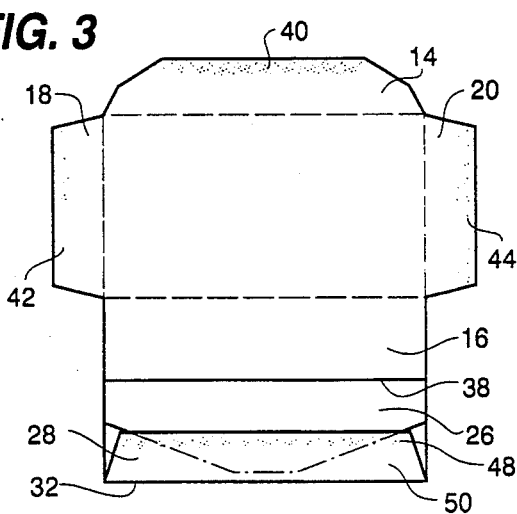
FIG. 3 is a plan view of the blank shown in FIG. 2 but shows a foldable panel portion folded inwardly over the rear panel.

FIG. 3 illustrates two additional folds. First, the reusable closure flap 26 is folded in half along the center fold line 38, and subsequently the foldable panel portion 24 is folded over a portion of the reusable closure flap 26 along the fold lines 32 and 36 with the surface 50 with the adhesive 48 now facing upwardly.

In FIG. 4, the rear panel 16 is shown folded along the rear panel fold line 12b and over the front panel 12.

In FIG. 5, the first and second side panels 18 and 20 are shown folded along the fold lines 12c and 12d, respectively, and the adhesive strips 42 and 44 are adhesively bound to the exterior surface 52 of the rear panel 16.

After an appropriate mailing piece has been stuffed into the envelope 11, the adhesive strip 40 on the seal flap 14 is adhered to the exterior surface 52 for initial mailing.

Also illustrated in FIG. 2 is an exterior surface 58 on the second section 30 of the foldable panel portion 24. An exterior surface 52 on the rear panel 16, the exterior surface 54 on the seal flap 14, an exterior surface 60 of the side flap 18, and an exterior surface 62 of the second side flap 20 are illustrated in FIG. 5. The exterior surface 56 of the front panel 12 is illustrated in FIG. 6.

FIG. 6 illustrates the envelope 11 sealed and ready for mailing. In one embodiment, the initial address can be pre-printed on the exterior surface 56.

FIG. 7 illustrates a conventional letter opener 64 being inserted into the envelope 11 in a normal manner, for opening the envelope 11 along the fold line 12a. After the envelope 11 is opened, the contents are removed.

FIGS. 8–12 illustrate how the envelope 11 is assembled along the various fold lines for remailing.

In FIG. 8, after the original contents of the envelope 11 have been removed, the foldable panel portion 24 is hingably folded out of the interior of the envelope 11, by unfolding along the second and third fold lines 32 and 36 to form a flap structure. Thereafter, the exterior surface 50 of the foldable panel 28 is adhesively bonded to the exterior surface 54 of the flap 14, as illustrated in FIG. 11.

Figure 9:
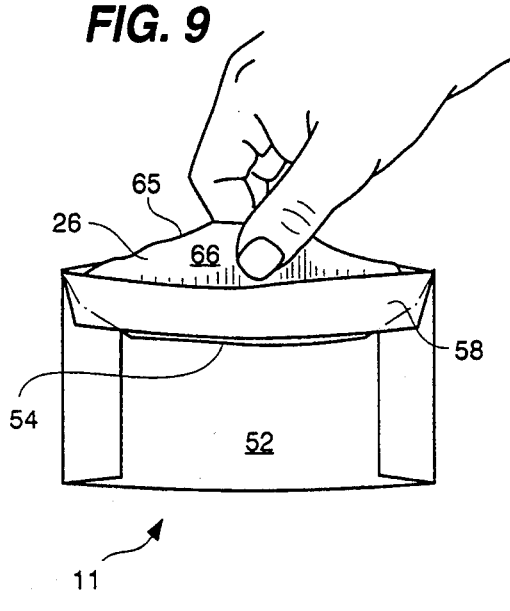
FIG. 9 is a rear view of the envelope shown in FIG. 8, with the foldable panel portion structure glued to the exterior surface of the envelope and the reusable closure flap partially removed from the inside of the envelope.
Figure 10:
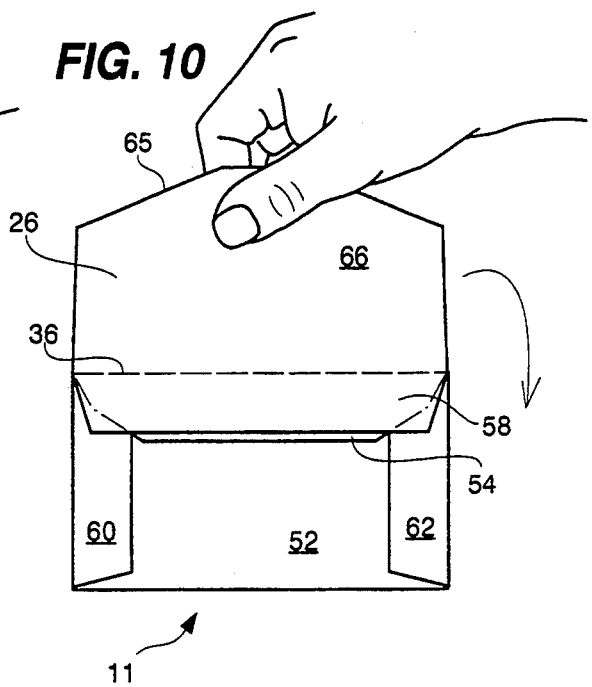
FIG. 10 is a rear view of the envelope shown in FIG. 9, and shows the reusable closure flap fully removed from the inside of the envelope so that the envelope is now ready for stuffing contents therein.

In FIGS. 9 and 10, the reusable closure flap 26 is removed from the interior of the envelope 11. The user has easy access to the reusable closure flap 26 since an upper edge 65 thereof is near the fold line 12a, as shown in phantom in FIG. 7.

In FIG. 9, a user has partially removed the reusable closure flap 26 by squeezing both sides of the reusable closure flap 26 and pulling it out.

In FIG. 10, the reusable closure flap 26 is in the fully extended position. The envelope 11 now can be restuffed.

In FIGS. 11 and 12 are shown rear and front views of the envelope 11 assembled for return mail after reusable closure flap 26 is folded about fold line 36 and the adhesive strip 46 is adhesively bonded to the exterior surface 56 of the front panel 12.

In one embodiment, an exterior surface 66 of the reusable closure flap 26 includes a pre-printed return address, as illustrated in FIG. 12.

In another embodiment, the reclosure flap 26 has at least one window 67a, shown in phantom in FIG. 12, for registering with return indicia on a return pre-printed address piece which is reinserted into the envelope, in place of a return address on the exterior surface 66 of the flap 26. In this embodiment of the envelope 11, the front panel 12 will have a mailing window 67b, shown in phantom in FIG. 1, which registers with the window 67a.

Figure 13:
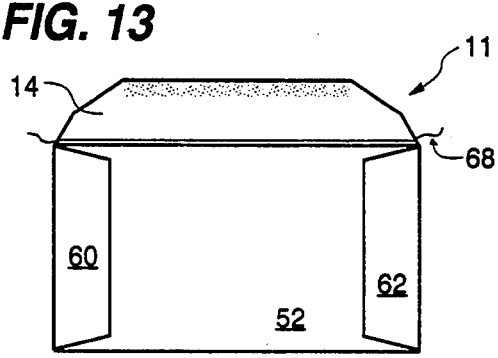
FIG. 13 is an elevational rear plan view of another embodiment of a reusable mailing envelope constructed according to the teachings of the present invention which includes a pull string for opening the envelope along a seal flap fold line.

In FIG. 13, an alternate embodiment of the envelope 11 is shown which includes a string 68 for facilitating the opening of the envelope 11 along the fold line 12a after initial mailing. Preferably, a customer pulls the string 68 upwardly, in FIG. 13, in a direction perpendicular to the fold line 12a for an improved tear along the fold line 12a.

Figure 14:
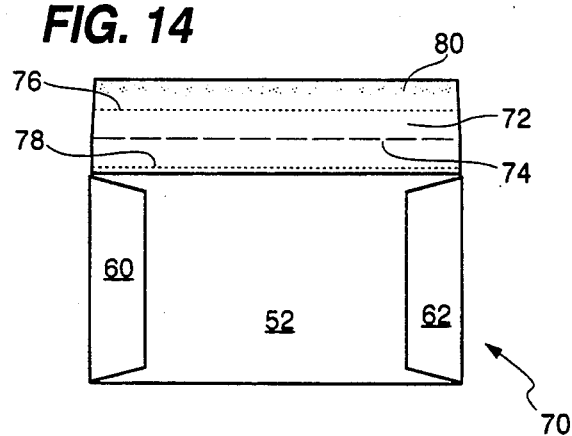
FIG. 14 is an elevational rear plan view of another embodiment of the reusable mailing envelope constructed according to the teachings of the present invention and shows a seal flap formation that includes a detachable portion.

In FIG. 14, an alternate embodiment of a reusable envelope 70 is shown, which includes a seal flap 72 having a fold line 74 and perforation lines 76 and 78 spaced the same distance away from the fold line 74, and an adhesive strip 80 near an edge of the seal flap 72. The perforations 76 and 78 are spaced inwardly from the edge of flap 72 and are parallel to the fold line 74. In use, the seal flap 72 is folded along fold line 74 and adhered to an exterior surface 52 of the rear panel 16 by the adhesive strip 80.

Figure 15:
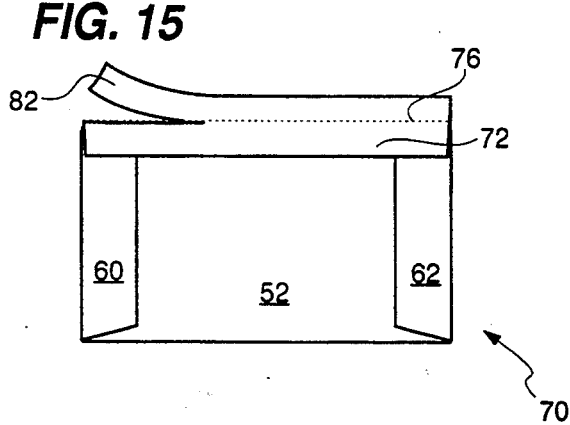
FIG. 15 is an elevational rear plan view of the reusable mailing envelope shown in FIG. 14 and shows the detachable seal flap sealed to the rear panel of the envelope as well as a detachable portion partially detached.

In FIG. 15 there is shown a portion of the seal flap 72 between perforations 76 and 78, defining detachable part 82, detached along perforations 76 and 78 to facilitate the opening of the seal flap 72 after receipt of initial mail. Here the detachable outer part 82 of the folded seal flap 72 is shown partially detached from the envelope 70.

Figure 16:
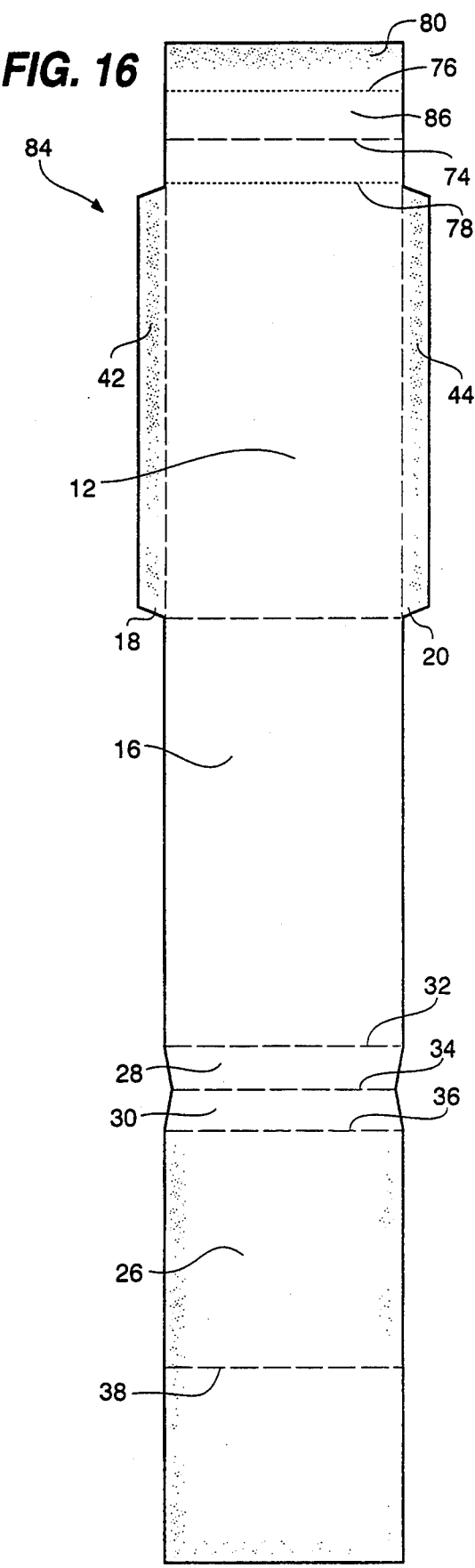
FIG. 16 is a plan view of a blank for use in the construction of a side loaded reusable mailing envelope which is constructed according to the teachings of the present invention and which is similar to the envelope shown in FIG. 1.

In FIG. 16, another alternate embodiment of a reusable envelope 84 is illustrated, which includes a side loading feature. The envelope 84 is substantially the same as the envelope 11 illustrated in FIGS. 1-12, with the exception that a seal flap 86 is modified to the construction of the seal flap 72 shown in FIGS. 14 and 15, and different dimensions are utilized.

Referring now to FIGS. 17-27, there is illustrated therein another embodiment of a blank 88 for constructing an envelope 89 (FIGS. 22 and 23) according to the teachings of the present invention.

Figure 17:
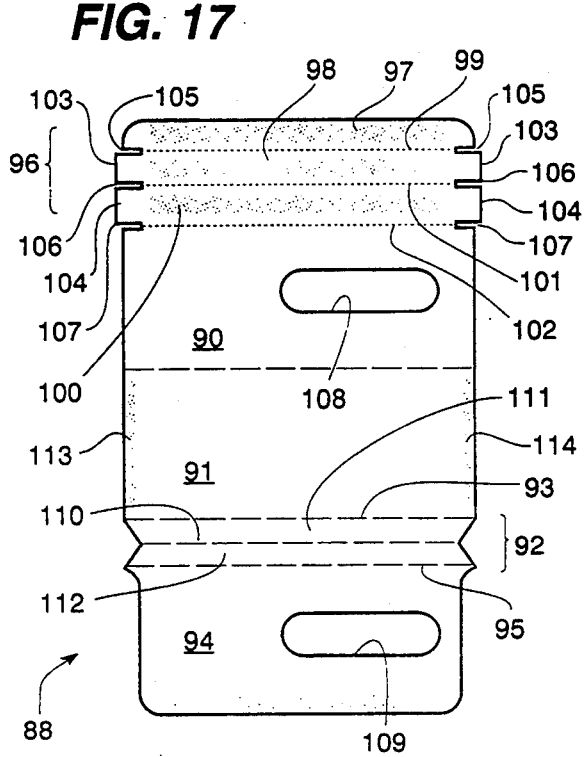
FIG. 17 is a plan view of a blank for use in the construction of a reusable mailing envelope constructed according to the teachings of the present invention, shows side margins of the front and rear panels secured together without side flaps by applying glue to the inside side margins of the rear panel and shows a modified sealing flap structure.

As shown in FIG. 17, the blank 88 includes a front panel 90, a rear panel 91, a foldable panel portion 92 connected along a fold line 93 to an edge of the rear panel 91 and a reusable closure flap 94 connected at a fold line 95 to the panel portion 92. At an upper edge of the front panel 90 there is connected a seal flap formation 96 which includes a seal flap 97 having an adhesive material on an inner surface thereof delineated from a first seal flap panel section 98 by a line 99 which can be a perforation line or a fold line and a second flap panel section 100 separated from the first flap panel section 98 by a line 101 which can be a perforation line or a fold line. Then the flap arrangement 96 is connected to the front panel 90 at a line 102, which can be a perforated line 102 or a fold line 102.

In FIG. 17 the lines 99, 101 and 102 are shown as perforation lines and the inner surface of each flap section 98 and 100 is shown with adhesive material thereon.

Preferably one of the flap seal sections 98 or 100 has a tab 103 and/or 104 protruding from one or both sides edges of the seal flap formation or arrangement 96. In the illustrated embodiment, both flap panel sections 98 and 100 are shown with protruding tabs 103, 104 defined between short narrow slots 105, 106 and 107 at the ends of lines 99, 101 and 102, between the seal flap 97 and the first seal flap section 98, between the first seal flap section 98 and the second seal flap section 100, and between the second seal flap section 100 and the front panel 90, respectively. In actual use, only one of the flap panel sections 98, 100 will have one or two tabs 103, 104 protruding outwardly from the side edge(s) of the blank 88 and the envelope 89 formed from the blank 88.

In the illustrated embodiment, the front panel 90 has a window 108 therein and the reusable closure flap 94 also has a window 109 which, when the closure flap 94 is folded over the front panel 90 for remailing the envelope 89, will register with the window 108 in the front panel 90.

As shown, the foldable panel portion 92 has a center fold line 110 separating the panel portion 92 into a first panel section 111 and a second panel section 112.

Figure 18:
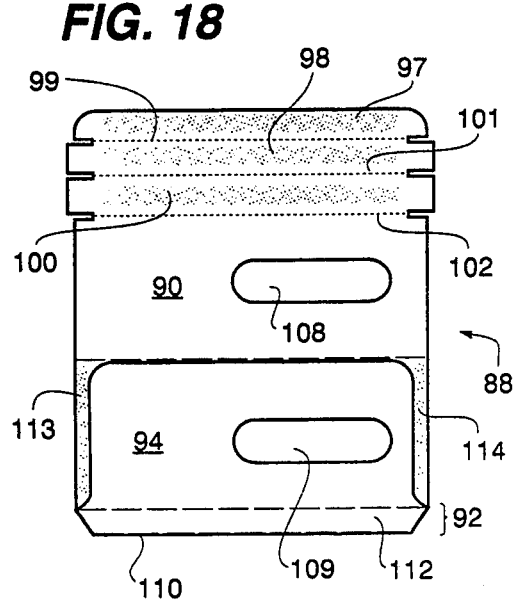
FIG. 18 is a plan view of the blank shown in FIG. 17 but shows a reusable closure flap folded over onto the rear panel of the blank.

In constructing the envelope 89, the closure flap 94 and the panel sections 111 and 112 of the foldable panel portion 92 are folded about the center fold line 110 upwardly to the position shown in FIG. 18.

Figure 19:
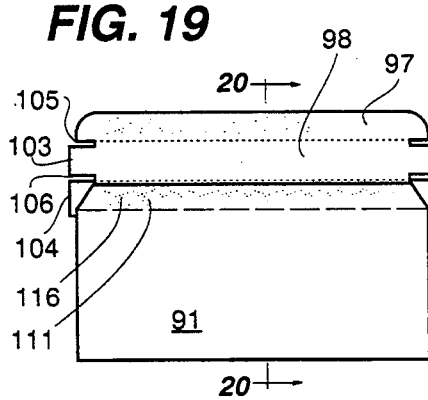
FIG. 19 is a plan view of the blank shown in FIG. 18 but shows the rear panel folded upwardly over a front panel of the blank and sealed along the edges.

Next, the rear panel 91 having the closure flap 94 folded thereupon is folded upwardly to the position shown in FIG. 19.

As shown in FIGS. 17 and 18, side margins 113 and 114 of the rear panel 91 have an adhesive or glue thereon for sealing with adjacent side margins of the front panel 90 when the rear panel 91 and the reusable closure flap 94 are folded upwardly from the position shown in FIG. 18 to the position shown in FIG. 19.

Of course, in the alternative, side flaps can be used as described above in connection with the embodiment shown in FIGS. 1-12.

In FIG. 17, both of the flap panel sections 98 and 100 are shown having a glue, adhesive or gum thereon, although, in practice, probably only one of the two flap panel sections 98 or 100 will have adhesive thereon.

Figure 22:
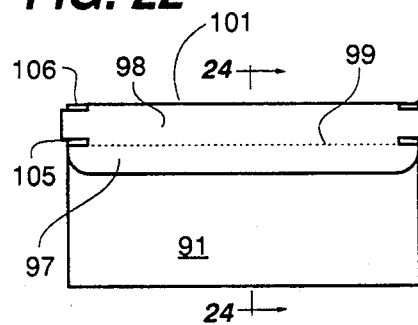
FIG. 22 is a rear view of the reusable envelope with the seal flap folded over and sealed to form an assembled envelope ready for mailing.
Figure 23:
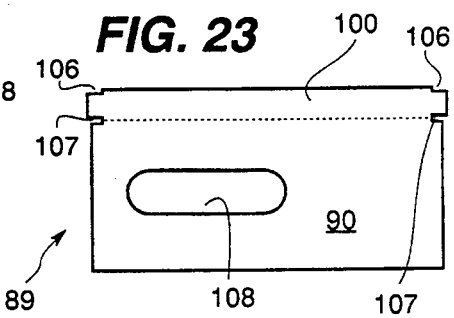
FIG. 23 is a front view of the envelope shown in FIG. 22.

Also, as noted above, in actual practice only one of the flap panel sections 98 or 100 will have end tabs 103 or 104 protruding beyond the side edges of the envelope 89 as shown in FIGS. 22 and 23.

Also, it will be noted that the slots 105, 106 and 107 are formed in the seal flap formation 96 at the end of each perforation line 99, 101 and 102 to facilitate separating one or the other flap panel sections 98 or 100 from the sealed envelope 89. Further, it is to be understood that if only one flap panel section 98 or 100 is to be removed, then the other flap panel section 100 or 98 will not only not have end tabs 103 or 104, but also it probably will not have slots 105 or 107 at each end of the perforation line 99 or 102 and that other line instead, will be a fold line.

Figure 20:
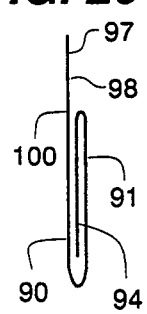
FIG. 20 is a cross-sectional view of the blank shown in FIG. 19 and is taken along the line 20—20 in FIG. 19.
Figure 21:
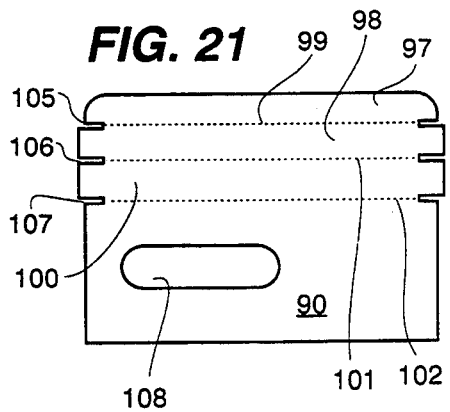
FIG. 21 is a front view of the blank shown in FIG. 19.

From the partially formed mailing envelope shown in FIG. 19 and FIG. 20, the seal flap arrangement 96 is folded about the middle perforation line 106 and the seal flap 97 is sealed to a rear outer surface of the rear panel 91, as shown in FIG. 22.

As shown, the reusable closure flap 94 and the front panel 90 each have a window 108 and 109, respectively therein and it will be understood that the window 109 in the reusable closure flap 94 is adapted to mate with the window 108 in the front panel 90 when the mailing envelope 89 is reused for return mail.

Figure 24:
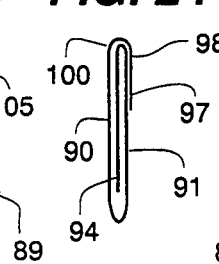
FIG. 24 is a cross-sectional view of the envelope shown in FIG. 22 and is taken along line 24—24 in FIG. 22.

FIG. 24 illustrates the cross section of the reusable envelope 89 when it is closed and sealed for initial mailing.

Turning now to FIGS. 25–27, FIG. 25a illustrates removal of the first flap panel section 98. Then FIG. 25b shows how the foldable panel portion 92 and the reusable closure flap 94 are pulled out of the envelope and folded over for remailing. In this embodiment, the second flap panel section 100 is not folded but allowed to remain extending upwardly and the reusable closure flap 94 is folded thereover. In the meantime, as shown, the foldable panel portion 92 is folded down over the rear panel 91 so that an outer surface 116 of the panel section 111 having adhesive thereon can be adhered to the back of the envelope 89 over the outer surface of the seal flap 97.

FIG. 25c shows where the second flap panel section 100 is folded outwardly and downwardly and the reusable closure flap 94 is folded thereover and sealed to outer surface 117 of the front panel 90.

FIG. 25d shows where the second flap panel section 100 is folded inwardly into the envelope and the reusable closure flap 94 is folded over the front panel 90 and sealed thereto.

FIG. 26a shows an embodiment where all three lines 99, 101 and 102 in the seal flap formation 96 are perforation lines and both the first flap panel section 98 and the second flap panel section 100 are removed. Then the foldable panel portion 92 is folded out and the outer surface 116 of the panel section 111 is sealed to the back side of the envelope 89, i.e., to outer surface 118 of the rear panel 91, and the reusable closure flap 94 is folded over the front panel 90 and a marginal area 119 on an inner surface of, and adjacent a free edge of, the closure flap 94, which has adhesive material thereon, is sealed to the outer surface 117 of the front panel, as shown in FIG. 26b.

In FIG. 27a, the second flap panel section 100 is removed leaving the first seal flap section 98 adjacent the reusable closure flap 94. The outer surface 116 of the panel section 111 then can be folded downwardly with, and over, the first seal flap section 98 and adhered to the outer surface 118 of the rear panel 91.

When the reusable mailing envelope 89 is used in this manner, the panel section 111 of the foldable panel portion 92 has sufficient width to extend beyond the backward-folded-over first flap section 98 as shown in FIG. 27b. Then the reusable closure flap 94 is folded over the front panel 90 and sealed thereto as shown in FIG. 27b.

As an alternative, and as shown in FIG. 27c, the first flap section 98 initially can be secured with an adhesive material to the outer surface of the panel section 112 of the foldable panel portion 92 and the foldable panel portion 92, unfolded, and the reusable closure flap 94 can be folded forwardly over the front panel and sealed thereto as shown in FIG. 27c.

Another embodiment of a blank 120 for forming a reusable mailing envelope 122 and constructed according to the teachings of the present invention is illustrated in FIGS. 28–37. In this mailing envelope 122, the foldable panel portion 92 of the blank 88 and the envelope 89 shown in FIGS. 17–27 is omitted.

Instead, the blank 120 comprises the front panel 90, the rear panel 91 connected at fold line 124 to the front panel 90, the reusable closure flap 94 connected at fold line 126 to the rear panel and the seal flap formation or arrangement 96.

Then, as shown in FIG. 29, the reusable closure flap 94 is folded upwardly over the rear panel 91. Next, as shown in FIG. 30, the rear panel 91 and reusable closure flap 94 are folded upwardly to the position shown in FIG. 30.

As in FIGS. 17–19, the seal flap formation 96 includes the sealing flap 97 which has adhesive, glue or gum on an inner surface thereof, and which is connected at the line 99 to the first seal flap panel section 98, the second seal flap panel section 100 which is connected to the first flap panel section 98 at the fold or perforation line 101 and which is connected to the front panel at the line 102.

One of the seal flap sections 98 or 100 has a pull tab 103 or 104 at each end thereof.

Also provided in this embodiment of a blank 120 and envelope 122 is address indicia 128 and a stamp placement area 130 on the outer surface of the second flap section 100 which can be used for an initial return address and stamp or postage area for the initial mailing of the envelope 122.

Additionally address indicia 132 can be provided on the outer surface of the first flap section 98 in the event the second seal flap section 100 is intended to be pulled or torn off and the first seal flap section 98 is used as a reusable closure flap and folded over the front panel 90 and adhered thereto. Then the address indicia 132 can be used as the return address for the remailing of the envelope 122.

Additionally or alternatively, address indicia 134 can be provided on the upper portion of the outer surface 117 of the front panel 90 and alternatively, a window 136 can be provided in the first seal flap section 98, instead of the address indicia 132, the window 136 being arranged to register with the address indicia 134 on the front panel 90 when the first flap section 98 is folded over the front panel 90 for the remailing of the envelope 122.

Further in this embodiment, the front panel 90 for the reusable envelope 122 is provided with a tear strip 140 in and adjacent bottom of the front panel 90 of the envelope 122. Typically, although not shown, some form of backing material such as paper or clear plastic material, e.g. cellophane, is adhered to the back side of the lower margin of the front panel 90 and to the lower margin of the inside of the rear panel 91 so that when the tear strip 140 is pulled off by gripping an end tab 142 of the tear strip 140 and pulling the tear strip 140 away from the envelope 122 shown in FIG. 34, the integrity of the envelope 122 is maintained.

If desired, indicia 146 can be provided on the outer surface 144 of the tear strip 140, which indicia 146 typically can be in the form of bar code, for facilitating mailing of the envelope to the addressee with the bar code having the zip code and other pertinent data relating to the address of the addressee. It will be understood that for remailing of such an envelope the bar code indicia 146 needs to be removed to prevent mismailing of the reusable envelope back to the initial addressee. Also, a return stuffing can have address indicia, such as bar code, thereon which is located on the stuffing or backing material so as to register with the window created by the removal of the tear strip 140. This can be in addition to address indicia on the stuffing adapted to register with a window 150 in the front panel, if a window 150 is provided in the envelope 122.

As will be described in greater detail hereinafter, FIGS. 57 and 58 illustrate the use of a piece of backing material, such as cellophane, over the inside surfaces of the front and the rear panels of an envelope in the area of a tear strip like the tear strip 140.

Since the reusable envelope 122 does not have a foldable panel portion 92, the reusable closure flap 94 is folded directly into the envelope 122 and the seal flap formation 96 is folded along the fold or perforation line 101 and the seal flap 97 is adhered to the back side of the envelope 122 as best shown in FIGS. 33 and 35. This will leave a space above the lines 99 and 102 between the front panel 90 and the rear panel 91 as well as end openings in the edges of the envelope 122 above the front and rear panels 90 and 91.

The manner in which this reusable envelope 122 is opened and then reused is shown in FIGS. 36 and 37.

In FIG. 36a, the second flap section 100 is shown removed. Then, the reusable closure flap 94 is pulled out of the envelope. In this embodiment, the reusable closure flap 94 is not used as a reclosure flap 94, but instead, is used as an advertising piece which is separable at the perforation/fold line 126. For this purpose the line 126 is perforated.

Then, the first flap panel section 98 can be folded forwardly and sealed to the outer surface 117 of the front panel 90 as shown in FIG. 36c.

In the embodiment shown in FIGS. 36d, 36e and 36f, the first flap panel section 98 is removed, followed by removal of the contents of the envelope. Then, as shown in FIG. 36e, the reusable closure flap 94 is pulled out and folded downwardly over the second flap panel section 100 which is folded with the reusable closure flap 94 against the front panel 90 and the reusable closure flap 94 is then sealed to the outer surface 117 of the front panel 90 for remailing of the envelope 122.

Alternatively, the second flap panel section 100 can be folded inwardly into the envelope 122 followed by folding of the reusable closure flap 94 downwardly over the front panel 90 of the envelope 122.

In FIG. 37a, both flap panel sections 98 and 100 are removed. Then, the reusable closure flap 94 is pulled out and, if desired, a portion 152 thereof adjacent the rear panel 91 can have been provided with fold lines therein to form a foldable panel portion 152 which is then folded over the seal flap 97 and the outer surface 118 of the rear panel 91 of the envelope 122 as shown in FIG. 37b.

Alternatively, the reusable closure flap 94 can be pulled out of the envelope 122 and then sealed to the front panel 90 only, as shown in FIG. 37c.

FIGS. 38-44 illustrate another embodiment of a blank 160 for constructing a reusable mailing envelope 162 (FIGS. 40 and 41) according to the teachings of the present invention. The blank 160 includes the front panel 90, the rear panel 91, the seal flap formation or arrangement 96 and side flaps 164 and 166. Omitted from this embodiment is the foldable panel portion and the reusable closure flap which, in this embodiment, is realized or defined by the first seal flap section 98 or the second seal flap section 100.

The rear panel 91 is folded upwardly over the front panel 90 as shown in FIG. 39 and then the seal flap 97 is folded over the rear panel 91 and adhered thereto as shown in FIG. 40.

Like in the previous two embodiments described above, the fold first and/or second seal flap sections 98 and/or 100 can have end tabs 103 or 104. Likewise, the outer surfaces of the first and/or second flap sections 98 and/or 100 can have address indicia 164 or 166 or a window 168; and the front panel 90 can have address indicia 170 on the outer surface 117 thereof and a tear strip 172 with or without bar code thereon.

From the view of the envelope in FIG. 39, the seal flap formation 96 is folded to the position shown in FIG. 40 and the seal flap 97 is sealed to the back side of the envelope 162. A front side of this envelope 162 is shown in FIG. 41 and shows the addresses indicia 166 on the outer surface of the second flap seal section 100 and on the outer surface 117 of the front panel 90.

Starting from a cross section of the envelope 162 shown in FIG. 42, the first flap panel section 98 can be removed and the second flap panel section 100 can be folded downwardly as shown in FIG. 43a.

Alternatively, the second flap panel section 100 can be removed and the first flap panel section 98 folded downwardly over the front panel 90 as shown in FIG. 43b.

In the embodiment shown in FIG. 44, the lines 99 and 102 can be fold lines only and not perforated lines. In this embodiment, the envelope 162 will be open by inserting an implement, such as a letter opener, into the upper space above the top edges of the front and rear panels 90 and 91 and between the first and second seal flap sections 98 and 100. Alternatively a string, like the string 68 shown in FIG. 13 can be provided. Then the envelope 162 is opened by cutting or pulling through the perforations of the perforated line 101 so as to separate the first and second seal flap sections 98 and 100 as shown in FIG. 44. Then one of these flap panel sections 98 or 100 can be folded into the envelope 162 and the other flap panel section 100 or 98 folded over the front panel or the rear panel as shown in FIGS. 47c and 47d. Note that in this embodiment, the inner surfaces of both seal flap sections 98 and 100 can have an adhesive material thereon.

In FIGS. 45-47, there is shown a modified embodiment of a blank 180 for constructing an envelope 182, similar to the envelope 162 shown in FIGS. 38-44. In this embodiment, the envelope 182 shown in FIG. 46 is formed from the blank 180 shown in FIG. 45, which is similar to the blank 160 shown in FIGS. 38 and 39 except for the fact that a tear away portion 184 is provided between the first and second seal flap sections 98 and 100 in the seal flap formation 96. Also, this embodiment does not utilize side flaps 164 or 166, but instead has adhesive in the margins along the side edges of either the front or rear panel 90 or 91 for being adhered to opposite margins adjacent side edges on the other panel 91 or 90.

The tear away portion 184 of the seal flap formation 96 is defined by parallel spaced perforation lines 186 and 188, each located in one of the seal flap sections 98 or 100 on opposite sides of the fold line 101. Preferably, a tab 190 protrudes outwardly from one or both ends of this middle tear away portion 184 as shown in FIGS. 45 or 46.

In use, the user will grip the folded tab 190 at either end of the tear away or break away portion 184 and pull it upwardly to open the envelope 182, as shown in FIG. 47b. Then, one of the seal flap panel sections 98 or 100 can be folded into the envelope and the other seal flap section 100 or 98 can be folded over the front 90 or rear 91 panel and secured thereto as shown in FIG. 47c and FIG. 47d.

Still another embodiment of a blank 200 (FIGS. 48 and 49) for constructing a reusable envelope 202 (FIGS. 50 and 51) is shown in FIGS. 48-52.

FIG. 48 is a rear plan view of the blank 200 and shows a rear panel 91 having a reusable sealing flap portion 204 with adhesive on an inner surface thereof defined in the marginal area adjacent a free edge 206 of the rear panel 91 which is folded up along a fold line 208 between the rear panel 91 and the front panel 90. A seal flap formation 96 has, in addition to the first and second seal flap sections 98 and 100, a third seal flap section 210 connected at a line 212 to the second seal flap section 100 and at a line 214 to the front panel 90. The line 214 can be a perforated line and the line 212 can be a fold line.

As shown in FIG. 49, the area on the outer surface 217 of the front panel 90 between the fold line 208 and the perforation line 214 has address indicia 220 and a stamp placement area 222. The address indicia 220 can be located lower than shown so that it will still be visible when the closure flap portion 204 is folded over the front panel 90. The third seal flap section 210 also has on the outer surface thereof address indicia 224 and a stamp placement area 226.

As shown in FIGS. 48, 49 and 50, the first seal flap section 98 is a tear away strip of small width and the second seal flap section 100 is much wider for extending downwardly over much of the outer surface 228 of the rear panel 91.

As shown in FIG. 50, after the rear panel 91 is folded upwardly the seal flap formation 96 is folded downwardly and the seal flap 97 is adhered to the outer surface 228 of the rear panel 91.

FIG. 51 illustrates the front of the envelope 202.

As shown in FIG. 52a, the first seal flap section 98 is removed to open the envelope 202. Then, as shown in FIG. 52b, the second and third seal flap sections 100 and 210 are removed by pulling the third seal flap section 210 at the perforation line 214 and the reusable sealing flap portion 204 then can be folded forwardly over the front panel 90 and sealed thereto. The outer surface of the closure flap portion 204 can be provided with address indicia and a stamp location area for use in the return mailing of the envelope 202.

FIGS. 53–54 illustrate a modified embodiment of a blank 240 and a reusable envelope 242 (FIG. 54) constructed therefrom according to the teachings of the present invention which is similar to the blank 200 and envelope 202 just described above.

In this embodiment, the upper marginal area 204 of the rear panel 91 is not used as reusable closure flap and the second seal flap section 100 is not as wide and has adhesive material on an inner surface thereof. Also the lines 212 and 214 are both fold lines.

In use, the seal flap formation 96 is folded downwardly about the fold line 212 over the rear panel 91 and the seal flap 97 is secured thereto as shown in FIG. 54. Then as shown in FIG. 55, to remove the contents of the envelope 242 after its first mailing, the first seal flap section 98 is pulled away by gripping an end tab 244 of the first seal flap section 98 and pulling the seal flap section 98 from the envelope 242.

Then, the third seal flap section 210 is folded rearwardly over the rear panel 91 and the second seal flap section 100, forming a reusable closure flap, is pulled downwardly and adhered to the outer surface of the rear panel 91.

With reference to FIGS. 57 and 58 of an envelope blank 260, it is intended that, in some of the embodiments described above, when an initial mailing is made, bar code can be provided on a tear-off strip 262 provided in a lower margin 264 of a front panel 266. Then, to maintain the envelope in tact after the tear-off strip 262 is pulled away from the front panel 266 of an envelope formed from the blank 260, a sheet of backing material 270, which can be pre-printed with bar code or which can be made of a transparent material such as cellophane, is situated over and fixed to the lower inside portion of the front panel 266 and lower inside portion of a rear panel 272 and behind the tear-off strip 262 in the lower margin of the front panel 266 as best shown in FIG. 57. In this way, after the blank 260 is folded into an envelope and the envelope is mailed, bar code 274 (FIG. 54) can be provided on the tear-off strip 262 and can be used by the postal service for directing the mail to its proper location. Then, after the envelope is received at its proper location, the user can pull away the tear-off strip 262 with the bar code 274 thereon leaving the folded backing material 270, which can be opaque paper, clear or translucent plastic or a sheet of cellophane, at the bottom of the envelope. Then, a stuffing that is contained in the envelope and which is reinserted into the envelope by the reuser of the envelope, such as a customer of a public utility, e.g. the telephone company, the electric company, the gas company, etc., can reinsert the stuffing with a bar code thereon indicating the address of the public utility located on the lower edge of the stuffing or insert so as to be visible through the clear plastic or cellophane sheet 270 at the lower margin of the front panel 266 of the envelope. The insert or stuffing will also, of course, have an address for the receiver of the remailed envelope, i.e., a public utility, which will appear in a window 278 in the front panel of the envelope. In this way, the mail can be quickly delivered to the sender, e.g. a public utility, by means of both the printed address appearing in the window 278 and the bar code address appearing through the cellophane sheet 270 at the lower margin of the front panel 266 of the envelope.

From the foregoing description, it will be understood that modifications can be made to the various embodiments of the reusable envelope and the blanks for forming same constructed according to the teachings of the present invention and described above. Also, it will be apparent that the reusable envelopes and blanks for making same described above have a number of advantages and features some of which have been disclosed above and others of which are inherent therein. Accordingly, the scope of the invention is only to be limited as necessitated by the accompanying claims.

I claim:

1. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, and reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of one of said seal flap sections of said reusable structure forms a resealing flap which is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope.

2. The envelope of claim 1 wherein said third line is a perforated line.

3. The envelope of claim 2 including a perforated line in said first seal flap section parallel to said third fold line.

4. The envelope of claim 1 wherein said second line is a perforated line.

5. The envelope of claim 1 wherein said envelope includes a second flap which is hingedly connected to said rear panel and which is a detachable flap having information thereon and said first seal flap section is a reusable closure flap which is adhered to said outer surface of said front panel after said second seal flap section and said second flap are detached from said envelope.

6. The envelope of claim 1 wherein the other of said seal flap sections has adhesive means on said inner surface thereof and defines a second flap of said reusable structure.

7. The envelope of claim 1 wherein at least one of said seal flap sections is detachable from said envelope and said detachable seal flap section has a protruding pull tab at at least one end thereof.

8. The envelope of claim 1 wherein said second seal flap section above said front panel has address indicia and a stamp plaement area on an outer surface thereof which can be used for the initial mailing of the envelope.

9. The envelope of claim 8 wherein said second seal flap section is a tear off strip which can be pulled off the envelope by the addressee after which said first seal flap section can be moved over an upper part of said front panel for resealing and reusing said envelope.

10. The envelope of claims 9 wherein said first seal flap section has address indicia on an outer surface thereof.

11. The envelope of claim 8 wherein said first seal flap section above said rear panel is a tear off strip which can be pulled off the envelope by the addressee after which said second seal flap section can be moved over the upper part of said rear panel for resealing and reusing said envelope 12. The envelope of claim 8 wherein said first seal flap section has address indicia on an outer surface thereof.

13. The envelope of claim 8 wherein said front panel has address indicia on an upper area of said outer surface thereof.

14. The envelope of claim 1 wherein said seal flap is adhered to said outer surface of said rear panel, said flap formation is folded about said fourth fold line and said envelope has an end opening on each side edge thereof above said front and rear panels and between said first and second seal flap sections.

15. The envelope of claim 1 wherein said seal flap sections each have a perforation line adjacent to and parallel spaced to said fourth fold line to form a pull away portion between said perforation lines and said pull away portion has at least one tab at one end projecting beyond one side edge of said envelope.

16. The envelope of claim 1 wherein said reusable structure includes a second flap which is hingedly connected along a fifth fold line to one of said rear or front panels.

17. The envelope of claim 1 wherein said seal flap formation further includes a third seal flap section having an inner surface and an outer surface and being connected between said second seal section and said second line along a fifth fold line to said second seal flap section and along said second line to said front panel.

18. The envelope of claim 17 wherein said third and fourth lines are perforation lines whereby, after said seal flap is adhered to said outer surface of said rear panel for initial mailing, said first seal flap section easily can be pulled away from said envelope for opening said envelope.

19. The envelope of claim 17 wherein at least one end of said first seal flap sections has a tab protruding beyond at least one side edge of said envelope.

20. The envelope of claim 17 wherein said second seal flap section is wider between said lines than said first seal flap section and initially is received over said outer surface of said rear panel.

21. The envelope of claim 1 wherein said second line is a fold line and said resealing flap is defined by said second seal flap section which has adhesive means on an inner surface thereof and which, after said first seal flap section is removed, is foldable over said rear panel by folding said remaining part of said seal flap formation downwardly along said second fold line.

22. The envelope of claim 1 wherein said seal flap formation has means associated therewith for facilitating opening of said envelope.

23. The envelope of claim 1 wherein said second seal flap section has a window therein which can register with a window in said front panel when said second flap is positioned over said front panel.

24. A reusable mailing envelope constructed from a blank comprising:
a front panel having an inner surface and an outer surface,
a rear panel having an inner surface and an outer surface and being connected to said front panel along a first fold line,
a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, and said fourth fold line being a perforated line.

25. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, and reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, and said third and fourth lines being perforated lines.

26. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, and at least one of said seal flap sections having address indicia on the outer surface thereof.

27. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, and said outer surface of said front panel in an upper area thereof having address indicia thereon and one of said seal flap sections having a window therein which will register with said return address indicia on said front panel when one of said seal flap sections is moved over said front panel.

28. A reusable mailing envelope constructed from a blank comprising:
   a front panel having an inner surface and an outer surface,
   a rear panel having an inner surface and an outer surface and being connected to said front panel along a first fold line,
   a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels,
   structure for securing said front and rear panels together along adjacent side edges thereof,
   reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope,
   at least one of said first and second seal flap sections having adhesive on and extending at least partially across said inner surface thereof parallel to said third and fourth lines and at least a part of at least one of said seal flap sections being detachable from said envelope, and at least one of said seal flap sections having address indicia on an outer surface thereof which will overly part of said front panel or part of said rear panel when one of said seal flap sections is moved over one of said front or rear panels.

29. A reusable mailing envelope constructed from a blank comprising:
   a front panel having an inner surface and an outer surface,
   a rear panel having an inner surface and an outer surface and being connected to said front panel along a first fold line,
   a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels,
   structure for securing said front and rear panels together along adjacent side edges thereof,
   reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope,
   at least one of said first and second seal flap sections having adhesive on and extending at least partially across said inner surface thereof parallel to said third and fourth lines and at least a part of at least one of said seal flap sections being detachable from said envelope,
   at least one of said front or rear panels having a designated area on an outer surface of a lower portion thereof and said designated area being a tear away area.

30. A reusable mailing envelope constructed from a blank comprising:
   a front panel having an inner surface and an outer surface,
   a rear panel having an inner surface and an outer surface and being connected to said front panel along a first fold line,
   a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels,
   structure for securing said front and rear panels together along adjacent side edges thereof,
   reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope,
   at least one of said first and second seal flap sections having adhesive on and extending at least partially across said inner surface thereof parallel to said third and fourth lines and at least a part of at least one of said seal flap sections being detachable from said envelope, at least one of said front or rear panels having a designated area on an outer surface of a lower portion thereof and said area being surrounded, at least in part, by perforations and having at least one tab to facilitate tearing away of said area from said outer surface.

31. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, at least one of said front or rear panels having a designated area on an outer surface of a lower portion thereof and said area having machine readable indicia thereon and being removable by pulling said area away from said outer surface of at least one of said front or rear panels.

32. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an inner surface thereof for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth fold line to said first seal flap section and being coupled along said second line to one of said front or rear panels, structure for securing said front and rear panels together along adjacent side edges thereof, and reusable structure, for allowing the envelope to be reused as a mailing envelope, coupled to one of said panels, said reusable structure including at least a part of at least one of said first and second seal flap sections, and said reusable structure having said first mailing condition when initially mailed and a second condition wherein at least a portion of said reusable structure is sealed to at least one surface of said envelope for remailing said reusable envelope, at least one of said first and second seal flap sections having adhesive on and extending at least partially across said inner surface thereof parallel to said third and fourth lines and at least a part of at least one of said seal flap sections being detachable from said envelope, and said fourth and second lines are perforated lines.

* * * * *